(12) United States Patent
Jogand-Coulomb et al.

(10) Patent No.: US 8,763,110 B2
(45) Date of Patent: *Jun. 24, 2014

(54) APPARATUSES FOR BINDING CONTENT TO A SEPARATE MEMORY DEVICE

(75) Inventors: Fabrice Jogand-Coulomb, San Carlos, CA (US); Farshid Sabet Sharghi, Los Altos Hills, CA (US); Bahman Qawami, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 1416 days.

This patent is subject to a terminal disclaimer.

(21) Appl. No.: 11/600,245

(22) Filed: Nov. 14, 2006

(65) Prior Publication Data

US 2008/0114958 A1    May 15, 2008

(51) Int. Cl.
*G06F 21/00* (2013.01)

(52) U.S. Cl.
USPC .............................. 726/16; 713/193

(58) Field of Classification Search
USPC ................. 711/164; 380/270; 726/2
See application file for complete search history.

(56) References Cited

U.S. PATENT DOCUMENTS

| | | | |
|---|---|---|---|
| 5,509,070 A | 4/1996 | Schull | |
| 5,564,038 A | 10/1996 | Grantz et al. | |
| 5,568,437 A | 10/1996 | Jamal | |
| 5,732,209 A | 3/1998 | Vigil et al. | |
| 5,794,006 A | 8/1998 | Sanderman | |
| 5,805,609 A | 9/1998 | Mote, Jr. | |
| 5,892,900 A | 4/1999 | Ginter et al. | |
| 5,982,681 A | 11/1999 | Scwarz | |
| 5,982,891 A | 11/1999 | Ginter et al. | |
| 5,995,624 A | 11/1999 | Fielder et al. | |
| 6,040,622 A | 3/2000 | Wallace | |
| 6,044,471 A | 3/2000 | Colvin | |
| 6,085,320 A | 7/2000 | Kaliski, Jr. | |
| 6,154,811 A | 11/2000 | Srbljic et al. | |
| 6,279,114 B1 | 8/2001 | Toombs et al. | |
| 6,298,446 B1 | 10/2001 | Schreiber et al. | |
| 6,401,224 B1 | 6/2002 | Schoniger et al. | |
| 6,732,304 B1 | 5/2004 | Ong | |

(Continued)

FOREIGN PATENT DOCUMENTS

| | | |
|---|---|---|
| CN | 1533646 | 9/2004 |
| EP | 0 715 243 | 6/1996 |

(Continued)

OTHER PUBLICATIONS

Office Action for U.S. Appl. No. 11/600,005, dated Jun. 30, 2009, 13 pages.

(Continued)

*Primary Examiner* — Gilberto Barron, Jr.
*Assistant Examiner* — Devin Almeida
(74) *Attorney, Agent, or Firm* — Brinks Gilson & Lione

(57) ABSTRACT

A memory device is provided. The memory device includes a memory configured to store information. The memory device also includes a memory controller in communication with the memory. The memory controller is configured to encrypt the information to define a parameter and access an account on a second memory device based on the parameter to gain access to content. The content is stored in the second memory device and the memory device and the second memory device are configured to be removably coupled to a computing device.

16 Claims, 12 Drawing Sheets

(56) References Cited

U.S. PATENT DOCUMENTS

| | | | |
|---|---|---|---|
| 6,820,148 B1 | 11/2004 | Cedar | |
| 6,901,457 B1 | 5/2005 | Toombs et al. | |
| 6,915,425 B2 | 7/2005 | Xu et al. | |
| 6,956,671 B2 * | 10/2005 | Monty et al. | 358/1.9 |
| 7,010,808 B1 | 3/2006 | Leung et al. | |
| 7,020,704 B1 | 3/2006 | Lipscomb et al. | |
| 7,036,020 B2 | 4/2006 | Thibadeau | |
| 7,107,378 B1 | 9/2006 | Brewer et al. | |
| 7,107,620 B2 | 9/2006 | Haverinen et al. | |
| 7,197,466 B1 | 3/2007 | Peterson et al. | |
| 7,209,995 B2 | 4/2007 | Pinto et al. | |
| 7,215,771 B1 | 5/2007 | Hamlin | |
| 7,231,360 B2 | 6/2007 | Sy | |
| 7,284,175 B2 | 10/2007 | Wang et al. | |
| 7,426,747 B2 | 9/2008 | Thibadeau | |
| 7,433,676 B2 | 10/2008 | Kobayashi et al. | |
| 7,484,103 B2 | 1/2009 | Woo et al. | |
| 7,493,656 B2 | 2/2009 | Goodwill et al. | |
| 7,549,044 B2 | 6/2009 | Lee et al. | |
| 7,555,464 B2 | 6/2009 | Candelore | |
| 7,685,596 B1 | 3/2010 | Webb et al. | |
| 7,698,480 B2 | 4/2010 | Bychkov et al. | |
| 7,702,590 B2 | 4/2010 | Malik | |
| 7,751,801 B2 | 7/2010 | Torvinen | |
| 7,844,836 B1 | 11/2010 | Weaver et al. | |
| 7,890,431 B2 | 2/2011 | Malik | |
| 8,041,337 B2 | 10/2011 | Kobayashi et al. | |
| 8,079,071 B2 | 12/2011 | Jogand-Coulomb et al. | |
| 2002/0003886 A1 | 1/2002 | Hillegass et al. | |
| 2002/0029350 A1 * | 3/2002 | Cooper et al. | 713/200 |
| 2002/0049679 A1 | 4/2002 | Russell et al. | |
| 2002/0052933 A1 | 5/2002 | Leonhard et al. | |
| 2002/0069420 A1 | 6/2002 | Russell et al. | |
| 2002/0077986 A1 | 6/2002 | Kobata et al. | |
| 2002/0077988 A1 | 6/2002 | Sasaki et al. | |
| 2002/0095588 A1 | 7/2002 | Shigematsu et al. | |
| 2002/0126846 A1 | 9/2002 | Multerer et al. | |
| 2002/0166047 A1 | 11/2002 | Kawamoto | |
| 2002/0196029 A1 | 12/2002 | Schmidt | |
| 2003/0007646 A1 | 1/2003 | Hurst et al. | |
| 2003/0069853 A1 | 4/2003 | Bryant | |
| 2003/0126086 A1 | 7/2003 | Sadadi | |
| 2004/0019801 A1 | 1/2004 | Lindholm et al. | |
| 2004/0039911 A1 | 2/2004 | Oka et al. | |
| 2004/0049724 A1 | 3/2004 | Bill et al. | |
| 2004/0103234 A1 | 5/2004 | Zer et al. | |
| 2004/0111373 A1 | 6/2004 | Iga | |
| 2004/0130944 A1 | 7/2004 | Krause et al. | |
| 2004/0179691 A1 * | 9/2004 | Hori et al. | 380/277 |
| 2004/0249768 A1 | 12/2004 | Kontio et al. | |
| 2004/0255138 A1 | 12/2004 | Nakae et al. | |
| 2005/0010531 A1 | 1/2005 | Kushalnagar et al. | |
| 2005/0021539 A1 | 1/2005 | Short et al. | |
| 2005/0022015 A1 | 1/2005 | Van Den Heuvel et al. | |
| 2005/0044046 A1 | 2/2005 | Ishiguro | |
| 2005/0091491 A1 | 4/2005 | Lee et al. | |
| 2005/0198510 A1 | 9/2005 | Robert et al. | |
| 2005/0210236 A1 | 9/2005 | Lee et al. | |
| 2005/0235143 A1 | 10/2005 | Kelly | |
| 2005/0251714 A1 | 11/2005 | Nishimura | |
| 2005/0287987 A1 | 12/2005 | Yamamoto | |
| 2006/0059096 A1 | 3/2006 | Dublish et al. | |
| 2006/0063594 A1 | 3/2006 | Benbrahim | |
| 2006/0069644 A1 | 3/2006 | Vataja et al. | |
| 2006/0085353 A1 | 4/2006 | Wang et al. | |
| 2006/0085354 A1 | 4/2006 | Hirai | |
| 2006/0095382 A1 | 5/2006 | Mahlbacher | |
| 2006/0118619 A1 | 6/2006 | Hulst et al. | |
| 2006/0136341 A1 | 6/2006 | Wajs | |
| 2006/0143698 A1 | 6/2006 | Ohara | |
| 2006/0144032 A1 | 7/2006 | Qawami et al. | |
| 2006/0195403 A1 | 8/2006 | New et al. | |
| 2006/0195864 A1 | 8/2006 | New et al. | |
| 2006/0200864 A1 | 9/2006 | Nakanishi et al. | |
| 2006/0236405 A1 | 10/2006 | Terauchi et al. | |
| 2007/0043667 A1 | 2/2007 | Qawami et al. | |
| 2007/0067241 A1 | 3/2007 | Malik | |
| 2007/0067301 A1 | 3/2007 | Malik | |
| 2007/0124603 A1 | 5/2007 | Yamamichi et al. | |
| 2007/0226790 A1 | 9/2007 | Maher et al. | |
| 2007/0255659 A1 | 11/2007 | Yen et al. | |
| 2008/0052686 A1 | 2/2008 | Jogand-Coulomb et al. | |
| 2008/0072060 A1 | 3/2008 | Cannon et al. | |
| 2008/0072061 A1 | 3/2008 | Cannon et al. | |
| 2008/0086693 A1 | 4/2008 | Jogand-Coulomb et al. | |
| 2008/0112562 A1 | 5/2008 | Jogand-Coulomb et al. | |
| 2008/0112566 A1 | 5/2008 | Jogand-Coulomb et al. | |
| 2008/0114686 A1 | 5/2008 | Jogand-Coulomb et al. | |
| 2008/0114692 A1 | 5/2008 | Jogand-Coulomb et al. | |
| 2008/0114693 A1 | 5/2008 | Jogand-Coulomb et al. | |
| 2008/0114772 A1 | 5/2008 | Jogand-Coulomb et al. | |
| 2008/0114880 A1 | 5/2008 | Jogand-Coulomb et al. | |
| 2008/0114958 A1 | 5/2008 | Jogand-Coulomb et al. | |
| 2008/0114982 A1 | 5/2008 | Bleumer et al. | |
| 2008/0115211 A1 | 5/2008 | Jogand-Coulomb et al. | |
| 2008/0163201 A1 | 7/2008 | Jogand-Coulomb et al. | |
| 2008/0163246 A1 | 7/2008 | Jogand-Coulomb et al. | |
| 2008/0244751 A1 | 10/2008 | Peinado | |
| 2008/0256617 A1 | 10/2008 | Cartwell | |
| 2008/0282083 A1 | 11/2008 | Risan et al. | |
| 2009/0138936 A1 | 5/2009 | Biderman et al. | |
| 2009/0158344 A1 | 6/2009 | Anglin, Jr. | |
| 2010/0005297 A1 | 1/2010 | Ganesan | |
| 2010/0036748 A1 | 2/2010 | Siegel et al. | |
| 2010/0041438 A1 | 2/2010 | Brown | |
| 2010/0043063 A1 | 2/2010 | Ueda et al. | |
| 2010/0077202 A1 | 3/2010 | Lee et al. | |
| 2011/0091036 A1 | 4/2011 | Norman et al. | |
| 2011/0099641 A1 | 4/2011 | Malik | |

FOREIGN PATENT DOCUMENTS

| | | | |
|---|---|---|---|
| EP | 1 278 331 | | 1/2003 |
| EP | 1 280 149 | | 1/2003 |
| EP | 1 445 888 | | 8/2004 |
| EP | 1 480 103 | | 11/2004 |
| EP | 1 496 642 | | 1/2005 |
| EP | 1 496 642 | A | 1/2005 |
| EP | 1 533 676 | A1 | 5/2005 |
| EP | 1 564 961 | | 8/2005 |
| EP | 1 598 822 | | 11/2005 |
| EP | 1 635 265 | * | 3/2006 |
| JP | H09-097216 | | 4/1997 |
| JP | 2004-015257 | | 1/2004 |
| JP | 2004-133654 | | 4/2004 |
| JP | 2004-326210 | | 11/2004 |
| JP | 2004-336719 | | 11/2004 |
| JP | 2004-347636 | | 12/2004 |
| JP | 2005085023 | | 3/2005 |
| JP | 2006-013641 | | 1/2006 |
| JP | 2006-303771 | | 11/2006 |
| JP | 2007-531149 | | 11/2007 |
| JP | 2008-524753 | | 7/2008 |
| TW | 200535865 | A | 11/2005 |
| TW | 1246293 | | 12/2005 |
| TW | 200627152 | A | 8/2006 |
| TW | 200629068 | A | 8/2006 |
| TW | 200634742 | A | 10/2006 |
| TW | 200635329 | A | 10/2006 |
| WO | WO 02/15020 | | 2/2002 |
| WO | WO 02/19266 | | 3/2002 |
| WO | WO 03/098409 | | 11/2003 |
| WO | WO 2005/084107 | A2 | 9/2005 |
| WO | WO 2006/011768 | | 2/2006 |
| WO | WO 2006/013924 | | 2/2006 |
| WO | WO 2006/069311 | | 6/2006 |
| WO | WO 2006/109970 | | 10/2006 |

OTHER PUBLICATIONS

Office Action for U.S. Appl. No. 11/600,300, dated Jul. 14, 2009, 17 pages.

International Search Report and Written Opinion for PCT/US2007/023399, dated Jun. 10, 2008, 17 pages.

(56) References Cited

OTHER PUBLICATIONS

Invitation to Pay Additional Fees for PCT/US2007/023648, dated Aug. 5, 2008.
Final Office Action for U.S. Appl. No. 11/599,655 dated Mar. 5, 2009, 16 pages.
International Search Report and Written Opinion for PCT/US2007/023648, dated Nov. 21, 2008, 18 pages.
Office Action for U.S. Appl. No. 11/509,978, dated Oct. 27, 2009, 19 pages.
Office Action for U.S. Appl. No. 11/599,655, dated Oct. 28, 2009, 14 pages.
Invitation to Pay Additional Fees for PCT/US2007/023399, filed on Nov. 9, 2007, 8 pages.
Office Action for U.S. Appl. No. 11/599,655 entitled, "Methods for Linking Content With License", filed on Nov. 14, 2006, 15 pages.
Office Action for U.S. Appl. No. 11/600,270 entitled, "Apparatus for Linking Content with License", filed on Nov. 14, 2006, 13 pages.
Office Action for U.S. Appl. No. 11/600,006, dated Oct. 24, 2008, 21 pages.
Office Action for U.S. Appl. No. 11/600,263, dated Dec. 8, 2009, 10 pages.
Office Action for U.S. Appl. No. 11/600,273, dated Dec. 8, 2009, 11 pages.
Office Action for U.S. Appl. No. 11/600,005, dated Feb. 23, 2010, 11 pages.
Office Action for U.S. Appl. No. 11/600,262, dated Jan. 27, 2010, 15 pages.
Office Action for U.S. Appl. No. 11/600,300, dated Mar. 8, 2010, 16 pages.
Office Action for U.S. Appl. No. 11/599,994, dated Mar. 23, 2010, 19 pages.
Office Action for U.S. Appl. No. 11/599,995, dated Mar. 22, 2010, 30 pages.
Office Action for U.S. Appl. No. 11/600,263, dated May 24, 2010, 10 pages.
Office Action for U.S. Appl. No. 11/599,655, dated Jun. 21, 2010, 14 pages.
Office Action for U.S. Appl. No. 11/599,994, dated Nov. 22, 2010, 18 pages.
Office Action for Chinese Patent Application U.S. Appl. No. 200780048917.7, dated Sep. 13, 2010, 11 pages.
Office Action for U.S. Appl. No. 11/599,994, dated Jun. 21, 2011, 11 pages.
Office Action for U.S. Appl. No. 11/600,300, dated Nov. 15, 2011, 17 pages.
Office Action for Chinese Patent Application Serial No. 200780045877.0, dated Jul. 13, 2011, 13 pages.
European Search Report for European Patent Application Serial No. 11185500.3, dated Dec. 8, 2011, 6 pages.
Office Action for U.S. Appl. No. 11/599,994, dated Jan. 31, 2012, 15 pages.
Office Action for European Patent Application Serial No. 07 867 399.3, dated Dec. 6, 2011, 8 pages.
Office Action for European Patent Application Serial No. 07 870 860.9, dated Dec. 6, 2011, 6 pages.
Office Action for U.S. Appl. No. 11/600,300, dated Mar. 16, 2011, 15 pages.
Office Action for U.S. Appl. No. 11/600,005, dated Apr. 4, 2011, 12 pages.
Office Action for Chinese Patent Application Serial No. 200780046575.5, dated Feb. 17, 2011, 19 pages.
Office Action for U.S. Appl. No. 11/600,005, dated Dec. 9, 2011, 12 pages.
Office Action for U.S. Appl. No. 11/600,300, dated Apr. 12, 2012, 16 pages.
Office Action for Chinese Patent Application Serial No. 200780046575.5 dated Mar. 27, 2012, 20 pages.
Notice of Allowance for U.S. Appl. No. 11/599,994, dated Aug. 2, 2012, 6 pages.
Office Action for U.S. Appl. No. 11/600,300, dated Sep. 14, 2012, 15 pages.
Office Action for U.S. Appl. No. 13/300,306, dated Aug. 29, 2012, 10 pages.
Decision of Rejection for Chinese Patent Application Serial No. 200780046575.5, dated Oct. 10, 2012, 22 pages.
Reasons for Refusal for Japanese Patent Application Serial No. 2009-537161, dated Oct. 23, 2012, 5 pages.
Reasons for Refusal for Japanese Patent Application Serial No. 2009-537160, dated Oct. 30, 2012, 9 pages.
U.S. Appl. No. 11/600,263, dated Dec. 21, 2010, 12 pages.
Notice of Allowance for U.S. Appl. No. 11/600,263, dated Aug. 10, 2011, 9 pages.
Office Action for European Patent Application Serial No. 07 870 861.7, dated Jan. 17, 2012, 5 pages.
Office Action for Japanese Patent Application Serial No. 2009-537162, dated Feb. 7, 2012, 6 pages.
Office Action for Chinese Patent Application Serial No. 200780045877.0, dated Nov. 21, 2012, 13 pages.
Decision to Refuse a European Patent Application for European Patent Application Serial No. 07 867 399.3, dated Dec. 5, 2012, 13 pages.
Decision of Refusal for Japanese Patent Application Serial No. 2009-537162, dated Nov. 27, 2012, 11 pages.
International Search Report and Written Opinion for PCT/US2007/023615, dated Jun. 2, 2008, 12 pages.
International Search Report and Written Opinion for PCT/US2007/023617, dated Jun. 11, 2008, 12 pages.
International Search Report and Written Opinion for PCT/US2007/023618, dated May 30, 2008, 10 pages.
International Search Report and Written Opinion for PCT/US2007/023649, dated May 29, 2005, 14 pages.
ISO/IEC 7816 Standard: "Identification Cards Integrated Circuit(s) Cards with Contacts", Part 1: Physical Characteristics, 8 pages, Oct. 15, 1998.
Knipper, Gary, "System ACE Configuration Solutions for Xilinx FPGA's", White Paper, May 18, 2006, 9 pages, WP151.
Kravitz, D.W. et al., "Achieving Media Portability Through Local Content Translation and End-to-End Rights Management", Proceedings of the 5th ACM Workshop on Digital Rights Management, pp. 27-36, Nov. 7, 2005.
Mercurio, Chris, "How to Disable the Auto-Launch "feature" for SD Cards", http://mytreao.net/archives.2006/08/hot-to-disable-the-autolaunch-feature-for-sd-cards.html (visited on Dec. 15, 2006).
"Microsoft to Embed Viral Growth into Zune MP3," http://www.adrants.com/2006/10/microsoft-to-enbed-viral -growth-into-zune.php, Oct. 25, 2006, 5 pages.
Office Action for U.S. Appl. No. 10/888,294, entitled, Non-Volatile Memory System with Self Test Capability, filed on Jul. 9, 2004, 13 pages.
SAMPLE: *MIMEfilt Demonstrates MIME Filter for Internet Explorer*, http://www.support.microsoft.com/default.aspx?scid=kb; EN-US;q260840 (visited on Aug. 29, 2006).
"Steve Jobs not bothered about Zune," http://www.earthtimes.org/articles/printstory.php?news=9817, Oct. 25, 2006, 1 page.
"The Multimedia Card System Specification", Version 2.11, Jun. 1999, Multimedia Card Association, Cupertino, CA, 53 pages.
"The Multimedia Card System Specification", Version 2.2, Jan. 2000, Multimedia Card Association, Cupertino, CA, 123 pages.
The MultimediaCard Product Manual, Revision 2, Apr. 2000, SanDisk Corporation, 86 pages.
Transmittal of the International Search Report and the Written Opinion of the International Search Authority, or the Declaration, Int'l Appl. No. PCT/US2000/024201, Int'l filed Jul. 7, 2005, mailed Dec. 21, 2005, 9 pages.
VERISIGN, *Unified Authentication Tokens*, http://www.verisign.com/products-services/security-services/unified-authentication/ (visited on Aug. 29, 2006).
Wilson, James Y., et al., "Inside Bluetooth-Part 1," *Dr. Dobb's Journal*, Mar. 2000, http://www.ddj.com, 5 pages.
Wilson, James Y., et al., "Inside Bluetooth-Part 2," Dr. Dobb's Journal, Apr. 2000, http://www.ddj.com, 4 pages.

(56) References Cited

OTHER PUBLICATIONS

Office Action for U.S. Appl. No. 11/600,300 dated Apr. 17, 2013, 15 pages.
Office Action for U.S. Appl. No. 13/300,306 dated Mar. 11, 2013, 6 pages.
Office Action for U.S. Appl. No. 11/599,655 dated Sep. 12, 2013, 16 pages.
Office Action for U.S. Appl. No. 11/600,300 dated Sep. 25, 2013, 16 pages.
Search Report for Taiwanese Patent Application Serial No. 096143092 dated Aug. 22, 2013, 1 page.
English Translation of Office Action for Taiwanese Patent Application Serial No. 096143092 dated Aug. 28, 2013, 9 pages.
English Translation of Office Action for Taiwanese Patent Application Serial No. 096143093 dated Aug. 30, 2013, 8 pages.
Office Action for European Patent Application Serial No. 07 870 861.7 dated Sep. 19, 2013, 6 pages.

* cited by examiner

APPARATUSES FOR BINDING CONTENT TO A SEPARATE MEMORY DEVICE

CROSS-REFERENCES TO RELATED APPLICATIONS

This application is related to U.S. patent application Ser. No. 11/600,262, filed on Nov. 14, 2006, and entitled "Methods for Binding Content to a Separate Memory Device," the disclosure of which is incorporated herein by reference.

FIELD OF THE INVENTION

Embodiments of the present invention relate generally to content access and, more particularly, to binding content to a separate memory device.

BACKGROUND

Digital rights management (DRM) is a technology used to protect and control the distribution of contents, such as music files, video files, and other contents. The DRM may, for instance, be used to limit the distribution and access of content to a particular mobile phone. Here, a user may purchase content stored in a memory card and, to bind the content with a mobile phone, the mobile phone stores a secret. In DRM, content is encrypted with a cryptographic key, whereby the cryptographic key can also be used to decrypt the content. A cryptographic key used to decrypt the content may be derived from the secret stored in the mobile phone and the content can therefore be accessed based on the cryptographic key.

A limitation with storing the secret in the mobile phone is that if the user changes to a different mobile phone, the content will not be accessible by this mobile phone because it does not include the secret. As a result, there is a need to further improve the protection of content.

SUMMARY

Various embodiments of the present invention provide methods, apparatuses, systems and/or devices for binding content to a separate memory device. It should be appreciated that the embodiments can be implemented in numerous ways, including as a method, a circuit, a system, or a device. Several embodiments of the present invention are described below.

In an embodiment, a memory device is provided. The memory device includes a memory configured to store information. The memory device also includes a memory controller in communication with the memory. The memory controller is configured to encrypt the information to define a parameter and access an account on a second memory device based on the parameter to gain access to content. The content is stored in the second memory device and the memory device and the second memory device are configured to be removably coupled to a computing device.

Other embodiments and advantages of the invention are apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

A detailed description of one or more embodiments is provided below along with accompanying figures. The detailed description is provided in connection with such embodiments, but is not limited to any particular embodiment. The scope is limited only by the claims and numerous alternatives, modifications, and equivalents are encompassed. Numerous specific details are set forth in the following description in order to provide a thorough understanding. These details are provided for the purpose of example and the described embodiments may be implemented according to the claims without some or all of these specific details. For the purpose of clarity, technical material that is known in the technical fields related to the embodiments has not been described in detail to avoid unnecessarily obscuring the description.

The embodiments described herein provide the binding of content to a separate memory device. To access content stored in a memory device, information from a separate memory device is retrieved. As will be explained in more detail below, a parameter is generated based on the information. With the parameter, the content may be accessed. Without the parameter, the content is not accessible. By using information from a separate memory device to access the content, the content is thereby linked to the separate memory device. The generation of a binding configuration is also described below.

Content Accessing

Figure 1:
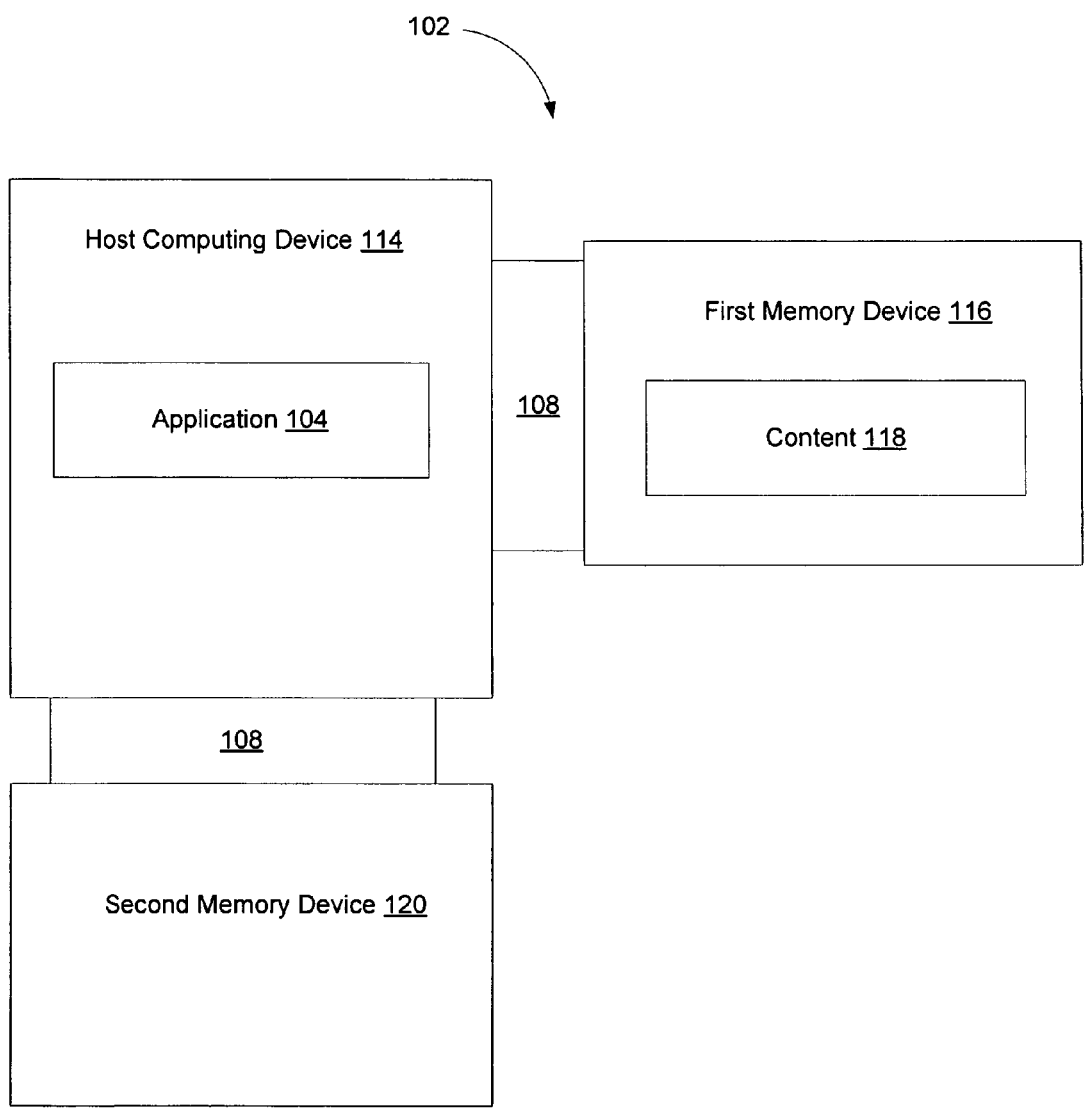
FIG. 1 is a simplified block diagram of a system of apparatuses for accessing content, in accordance with an embodiment of the invention.

FIG. 1 is a simplified block diagram of a system of apparatuses for accessing content, in accordance with an embodiment of the invention. As shown in FIG. 1, system 102 includes host computing device 114, first memory device 116, and second memory device 120. In an embodiment, first memory device 116 and/or second memory device 120 may be removably coupled to host computing device 114 by way of mechanical interface 108 such as pin and/or socket connectors. In another embodiment, first memory device 116 and/or second memory device 120 may interface with host computing device 114 through a contactless interface. With contactless interface, for example, host computing device 114 may communicate with first memory device 116 and/or second memory device 120 through Radio Frequency Identification (RFID) induction technology. First memory device 116 and second memory device 120 are memory storage devices. As will be explained below, an example of first memory device 116 is a memory card using non-volatile memory. In another example, second memory device 120 is a smart card, such as a Subscriber Identity Module (SIM) card.

Host computing device 114 can include a variety of electronic devices capable of accessing first memory device 116 and second memory device 120. Access may include storing content 118 on first memory device 116. Access may also include reading or retrieving content 118 from first memory device 116. Host computing device 114 hosts application 104. Application 104 may include a variety of program applications. For example, application 104 may be an operating system that manages the hardware and software resources on host computing device 114. In another example, application 104 may be a multimedia player configured to play audio and video files. Additionally, for example, application 104 may be a video game. Application 104 may access content 118 stored in first memory device 116. Content 118 can include a variety of data. Examples of content 118 include audio files encoded in audio file formats such as WAVE, MPEG-1 Audio Layer 3 (MP3), Advanced Audio Coding (AAC), and other audio file formats. Content 118 may also include video files encoded in video file formats such as Audio Video Interleave (AVI), Moving Picture Experts Group (MPEG), and other video file formats. Other examples of content 118 include document files, image files, application files, and other data.

Figure 2:
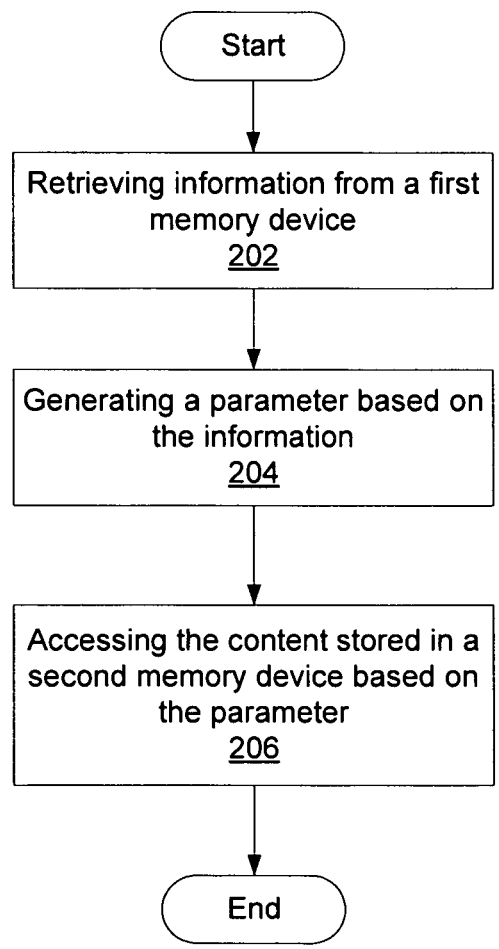
FIG. 2 is a flowchart diagram of a general overview for accessing content stored in a memory device, in accordance with an embodiment of the invention.

FIG. 2 is a flowchart diagram of a general overview for accessing content stored in a memory device, in accordance with an embodiment of the invention. As shown in FIG. 2, information from a first memory device is retrieved at 202. The information is stored in the first memory device and may include a variety of data. For example, information may be associated with a mobile phone, such as an identifier. The identifier may be configured to identify, for example, a network associated with the mobile phone (i.e., a network identifier), a user, a phone number, or a country (i.e., country identifier). The network identifier and the country identifier may be included in an International Mobile Subscriber Identity (IMSI). The IMSI is a unique number that is associated with a networked mobile phone and can be stored in a SIM card. An IMSI can be fifteen digits long where a portion of the digits (e.g., first three digits) can be the country identifier (e.g., Mobile Country Code (MCC)) and the other portion of the digits (e.g., the next twelve digits) can be the network identifier (e.g., Mobile Network Code (MNC)). The phone number of the mobile phone can be included in a Mobile Station Integrated Services Digital Network (MSISDN), which can also be located in a SIM card. The MSISDN may be a fifteen digit number that identifies the phone number of the mobile phone. In addition to identifiers, the information retrieved from the first memory device can include a serial number of a host computing device, a serial number of the first memory device, and other information.

After the information from the first memory device is retrieved, a parameter is generated based on the information at 204. In other words, the parameter may be expressed as $$\text{Parameter} = F(\text{Information}) \quad (1.0)$$

where the parameter is a function of the information. The function may include a variety of functions, such as a cryptographic function. For example, in an embodiment, the information may be encrypted based on a cryptographic function to define the parameter. An example of a cryptographic function is a hash function, whereby the parameter can be a hash value of the hash function. Other cryptographic functions may be based on the Advanced Encryption Standard (AES), Data Encryption Standard (DES), or other encryption techniques. The resulting parameter as defined in Equation 1.0 includes a variety of data that may be associated with the access of or gaining access to the content. For example, the parameter may be a cryptographic key used for the decryption (and encryption) of the content. Instead of the cryptographic key, the parameter may also include a reference to the cryptographic key. The reference, for instance, may be a number or string that identifies the cryptographic key. The parameter may also include an authentication key. The authentication key is a cryptographic key used for authentication sessions between, for example, the host computing device and the first memory device or between the first memory device and a second memory device. In another example, the parameter may be a cryptographic nonce. A cryptographic nonce is a number that can be used to generate a cryptographic key or an authentication key. Furthermore, the parameter may also include a credential that can be used to access, for example, an account on the second memory device. The credential can include, for example, an account name associated with an account, a password associated with the account, or other credentials.

At 206, content stored in a second memory device is accessed based on the parameter. Depending on the type of security system used, the content can be accessed by a number of different techniques. For example, in an embodiment, the parameter is a cryptographic key or a reference to a cryptographic key and the parameter is used to decrypt the content stored in the second memory device. In another embodiment, the parameter may be a credential or authentication key used to gain access to an account on the second memory device such that the content stored in the second memory device may be accessed. As will be explained in more detail below, access to an account may include authentication techniques such as login mechanisms, challenge/signed response, and other authentication techniques. With the access of content dependent on the generated parameter, the content is bound to the first memory device or information stored in the first memory device. As a result, content stored in the second memory device cannot be accessed without the first memory device.

Figure 3:
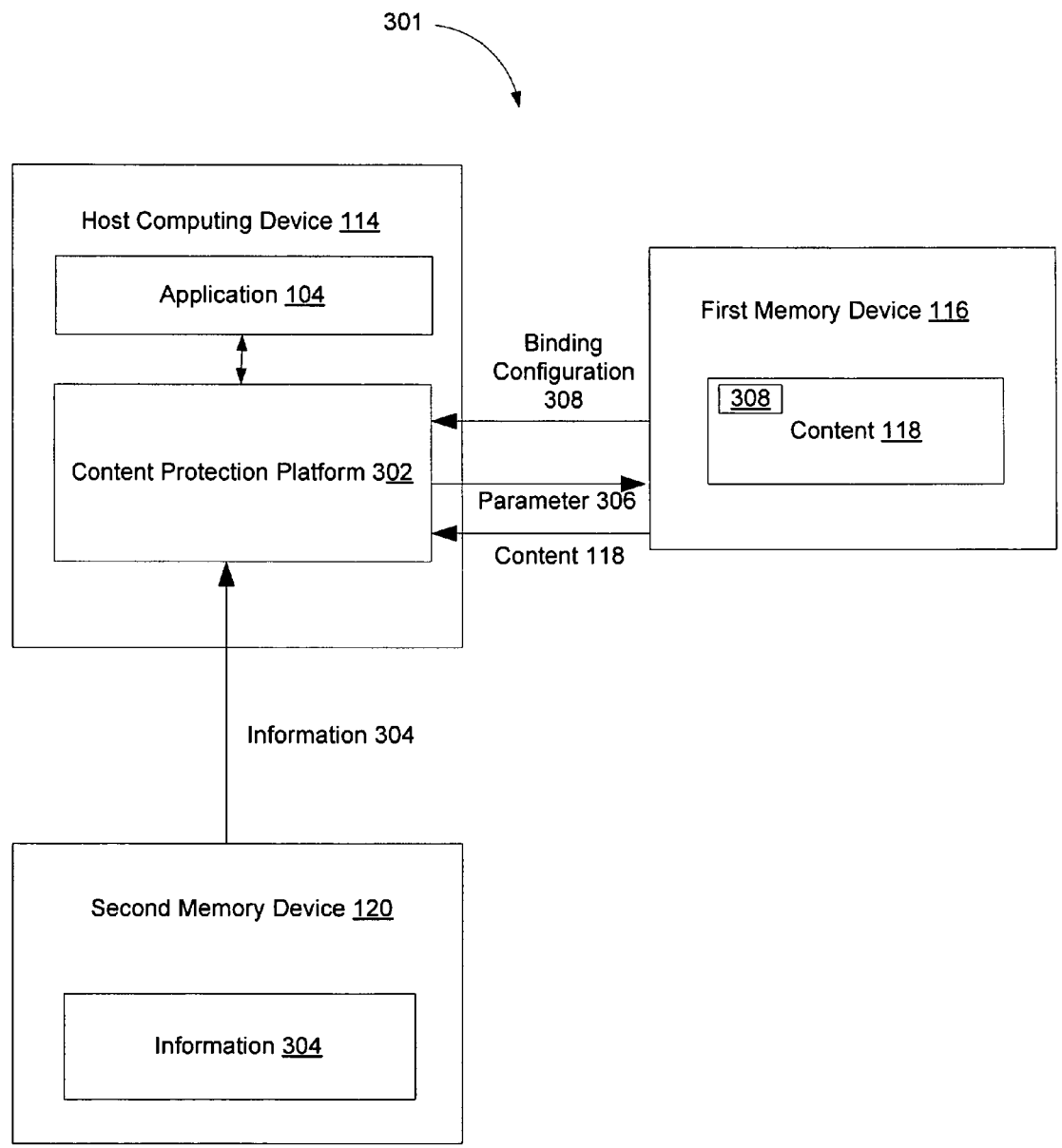
FIG. 3 is a simplified block diagram of a system for accessing content, in accordance with an embodiment of the invention.

FIG. 3 is a simplified block diagram of a system for accessing content, in accordance with an embodiment of the invention. System 301 includes host computing device 114 removably coupled to first memory device 116 and second memory device 120. Application 104 and content protection platform 302 are hosted on host computing device 114. Content 118 and information 304 are stored in first memory device 116 and second memory device 120, respectively. In an embodiment, host computing device 114 may be configured to generate parameter 306 based on information 304 and access content 118 stored in first memory device 116. For example, content protection platform 302 hosted on host computing device 114 may include the program instructions to generate parameter 306 and to access content 118. Application 104 may access content 118 by way of content protection platform 302. In general, content protection platform 302 is a technology platform for securing content 118 to first memory device 116. With content protection platform 302, a user may transfer first memory device 116 and its content 118 without compromising the content protection. There are a variety of content protection platforms that may be used for securing content, examples being sold under the trademarks Trusted-Flash™ and Gruvi™ (as manufactured by SanDisk, Inc.).

In an embodiment, content protection platform 302 may initially retrieve binding configuration 308 associated with content 118. In general, binding configuration 308 includes information regarding the security to be used to bind content 118 with second memory device 120 or information from the second memory device. Binding configuration 308 can include information associated with the generation of parameter 306 (e.g., encryption of information 304) and the access of content 118 (e.g., accessing an account associated with the content). For example, binding configuration 308 may specify the type of credential, the security method (e.g., access by authentication, decryption of content 118, and other security methods), the access protocol, the account location for use in login, the type of information (e.g., IMSI, network ID, phone number, and other information) the content is associated with (or bound to), and other binding configurations. In addition, as will be explained in more detail below, binding configuration 308 may include a location of a license that is associated with content 118. Note that binding configuration 308 is associated with content 118. To be associated with content 118, binding configuration 308 may be located or included in content 118. For example, binding configuration 308 may be located in the header or footer of content 118, which may not be encrypted. Alternatively, binding configuration 308 may be located separately from content 118. If located separately, binding configuration 308 may be associated with content 118 with the inclusion of a pointer to the content. Content 118 may also include a pointer to binding configuration 308 if the binding configuration is located separately from the content. It should be appreciated that content protection platform 302 may already be configured to use a pre-defined binding configuration. In other words, binding configuration 308 may be preprogrammed in content protection platform 302. As a result, in another embodiment, content 118 does not include binding configuration 308 and therefore, the binding configuration is not retrieved.

Still referring to FIG. 3, content protection platform 302 then retrieves information 304 from second memory device 120 and, as shown in Equation 1.0, generates parameter 306 based on the information. In an embodiment, parameter 306 may be generated by encrypting information 304. Binding configuration 308 may define the type of encryption (AES, DES, and other encryption techniques). Content protection platform 302 can then access content 118 stored in first memory device 116 based on parameter 306. In an embodiment, access may include the use of parameter 306 to decrypt content 118. In another embodiment, as will be explained in more detail below, access may include the use of parameter 306 to access an account on first memory device 116.

Figure 4:
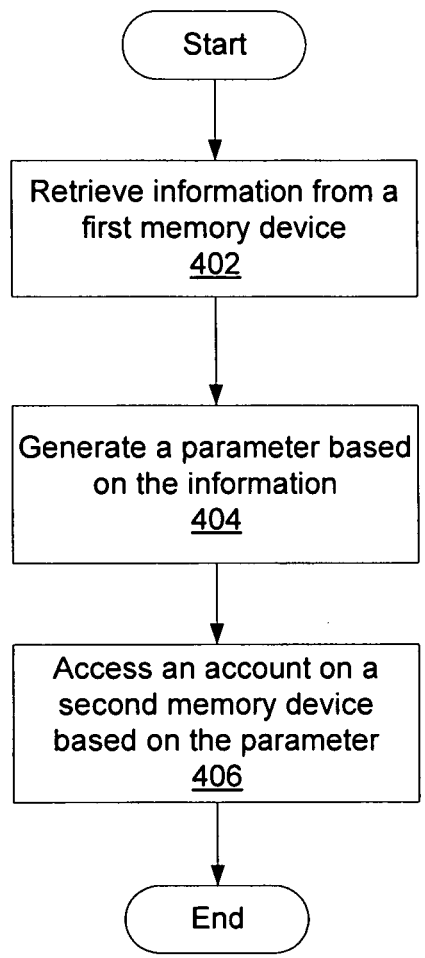
FIG. 4 is a flowchart diagram depicting the access of an account to gain access to content, in accordance with an embodiment of the invention.

FIG. 4 is a flowchart diagram depicting the access of an account to gain access to content, in accordance with an embodiment of the invention. At 402, a content protection platform hosted on a host computing device, such as a mobile phone, retrieves information stored in a first memory device. Here, the memory device is removably coupled to the host computing device and the first memory device may, for example, be a SIM card. With the information, the content protection platform generates one or more parameters based on the information at 404, which is expressed in Equation 1.0. In an embodiment, the parameter may be generated by encrypting the information. In other words, the information is encrypted using a cryptographic function to define a parameter. By using encryption to generate the parameter, the source of the information used to generate the credential is masked or hidden.

At 406, the parameter may be used for accessing an account on a second memory device, in accordance with an embodiment. It should be appreciated that this second memory device may also include a content protection platform to protect content stored in the memory device. Some content protection platforms, such as TrustedFlash™, use accounts to protect content stored in the second memory device. An account defines the grouping of one or more contents stored in the memory device. An account, for example, may include a partition on the memory device, a file directory on the memory device, an area of storage on a content protection platform, or other content groupings. The account may be associated with one or more contents. By gaining access to the account, the content that is associated with the account may be accessed or decrypted.

An account can provide an authentication mechanism to access content associated with the account. It should be appreciated that authentication is the process of verifying the identity of an authorized memory device, host computing device, user, network, or other identities. In an embodiment, an authentication technique includes a login mechanism. Here, the account may be accessed by login to the account. In other words, access can be gained by login to the account. For example, credentials, such as account name and password, may be transmitted to the second memory device. With the correct account name and password, the account can be accessed and, as a result, the content associated with the account also may be accessed. In another embodiment, an authentication technique may include a challenge and response mechanism where the host computing device sends a challenge to the second memory device. In response, the second memory device may encrypt the challenge based on an authentication key or a reference to an authentication key to generate a signed response. The reference to the authentication key, for instance, may be a number or string that identifies the authentication key. The second memory device can include a secure store that stores cryptographic keys, such as authentication keys. With the reference, the second memory device can retrieve the authentication key from the secure store. The second memory device transmits the signed response to the host computing device and the host computing device then verifies the signed response. Upon verification, an application may access an account on the second memory device to gain access to content that is associated with the account. If access to the account is granted, the content associated with the account may be retrieved or decrypted from the second memory device. Otherwise, if access to the account is not authorized, the content cannot be accessed.

Figure 5:
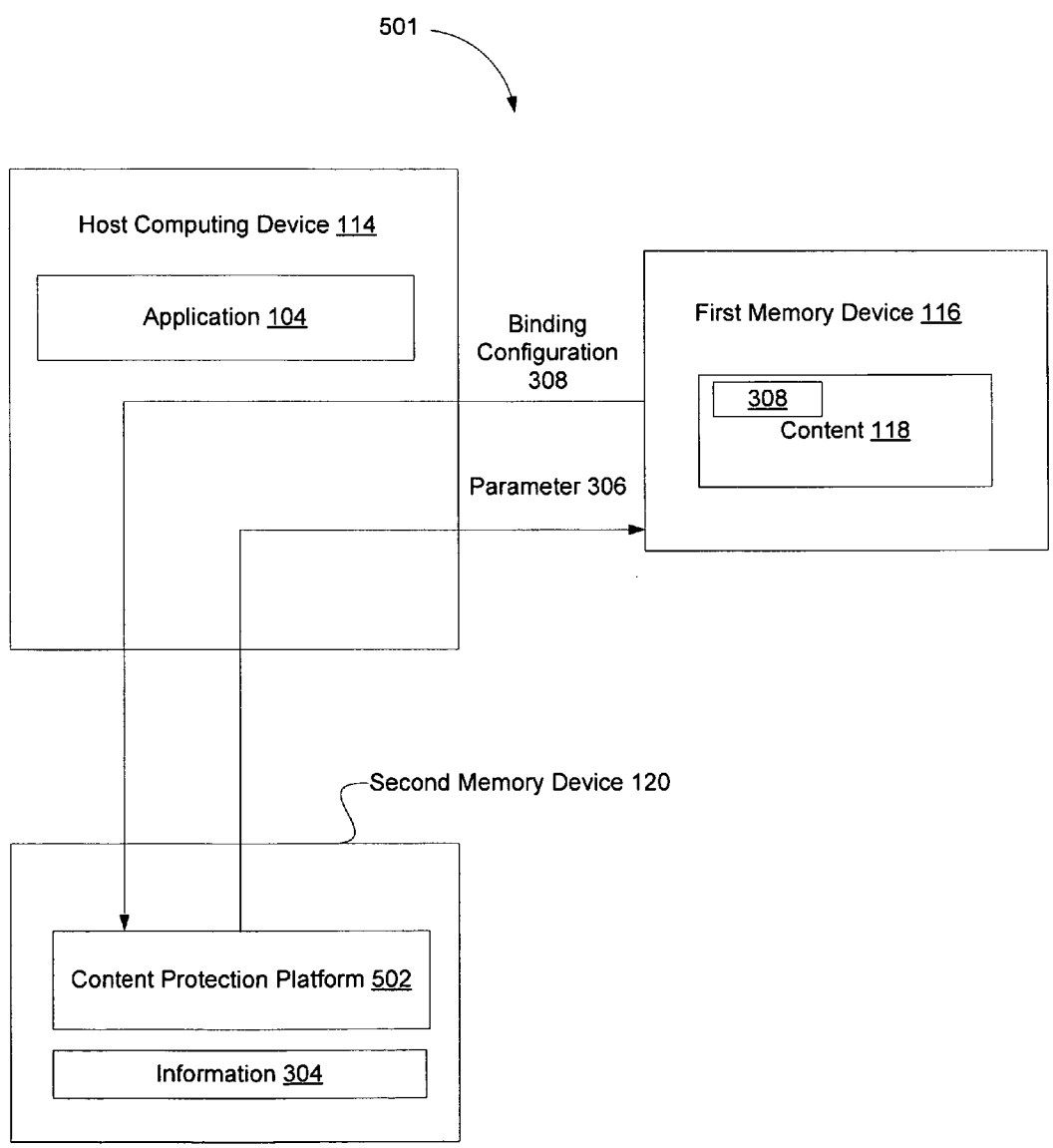
FIG. 5 is a simplified block diagram of a system for accessing content, in accordance with another embodiment of the invention.

FIG. 5 is a simplified block diagram of a system for accessing content, in accordance with another embodiment of the invention. System 501 includes host computing device 114 removably coupled to first memory device 116 and second memory device 120. Application 104 is hosted on host computing device 114 and content 118 and information 304 are stored in first memory device 116 and second memory device 120, respectively. In addition to host computing device 114, second memory device 120 may also be configured to generate parameter 306 based on information 304 and to access content 118 stored in first memory device 116. Here, second memory device 120 may include content protection platform 502, which may be in the form of an applet, and the content protection platform includes the program instructions to generate parameter 306 and to access content 118.

Content protection platform 502 may retrieve binding configuration 308 from content 118 and information 304 from second memory device 120. Parameter 306 may be generated based on information 304. Content protection platform 502 can then access content 118 stored in first memory device 116 based on parameter 306. The various embodiments to access content 118 are described above. Since content protection platform 502 is included in second memory device 120, host computing device 114 mainly facilitates communication between first memory device 116 and second memory device 120. For example, content protection platform 502 retrieves binding configuration 308 from first memory device 116 by way of host computing device 114. In another example, content protection platform 502 transmits parameter 306 to first memory device 116 by way of host computing device 114.

Figure 6:
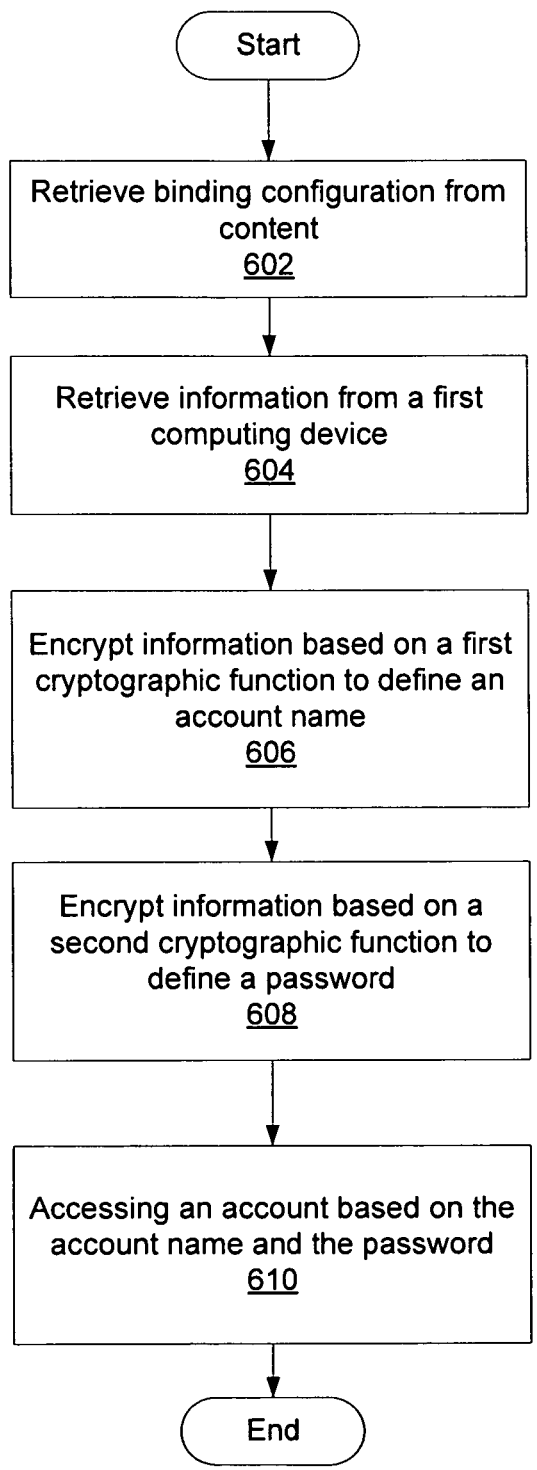
FIG. 6 is a flowchart diagram depicting the access of an account to gain access to content, in accordance with another embodiment of the invention.

FIG. 6 is a flowchart diagram depicting the access of an account to gain access to content, in accordance with another embodiment of the invention. Starting at 602, a content protection platform included in a first memory device retrieves binding configuration from content stored in a second memory device. Both the first and second memory devices are removably coupled to a host computing device. At 604, the content protection platform also retrieves information stored in the first memory device.

With the binding configuration and the information, the content protection platform encrypts the information based on a first cryptographic function at 606 to define an account name. The account name may be expressed as $$\text{Account Name} = F_1(\text{Information}) \quad (2.0)$$

where the account name is a function of the information. The binding configuration may define the type of cryptographic function $F_1$ used to encrypt the information. For example, the information may be encrypted based on AES.

At 608, the content protection platform encrypts the information again based on a second cryptographic function, which is different from the first cryptographic function, to define a password. The password may be expressed as $$\text{Password} = F_2(\text{Information}) \quad (3.0)$$

wherein the password is a function of the information. Here, the binding configuration may also define the type of cryptographic function $F_2$ used to encrypt the information. For example, the information may be encrypted based on a hash function.

At 610, the account may be accessed based on the account name and the password. For example, the content protection platform may login to an account on the second memory device using the account name and password, as defined in Equations 2.0 and 3.0, respectively. Since the content is associated with the account, access to the account also gains access to the content.

Generation of a Binding Configuration

Figure 7:
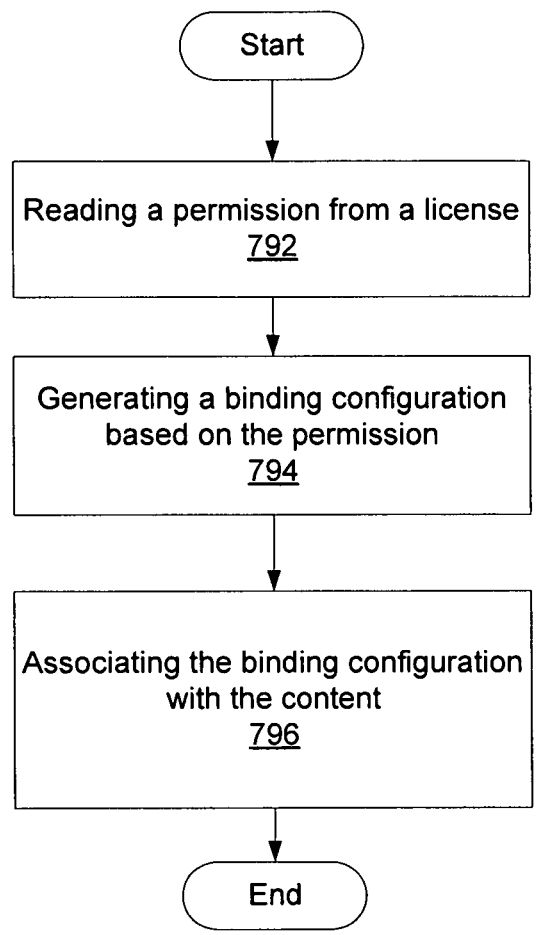
FIG. 7 is a flowchart diagram of a general overview for generating a binding configuration, in accordance with an embodiment of the invention.

FIG. 7 is a flowchart diagram of a general overview for generating a binding configuration, in accordance with an embodiment of the invention. When a host computing device receives content and associated license, the host computing device may retrieve the permission from the license at 792. In general, a license is data (e.g., a string, a file, and other data) that enables content to be accessed. License may include the permissions or rules to access content, such as duration of access, limiting the access of the content to a particular computing device, dates, times, a number of times the content may be accessed, and other permissions. The license therefore may be configured to define the permissions to access content. A user therefore is allowed access to content based on the permissions included in the license. For example, the license may allow content in the form of a music file to be played three times on a specific computing device. In another example, license may allow the content to be accessed but not copied to another computing device.

As shown in 794, the binding configuration may be generated based on the permission. As discussed above, the binding configuration can include the type of information from a memory device (or host computing device) that is associated with the content. In other words, the binding configuration can specify the binding of content with particular information from a memory device or host computing device. For example, the binding configuration may specify that the content is bound to an IMSI stored on a SIM card, a phone number stored on a host computing device, a network identifier from the IMSI stored on a SIM card, information associated with a user, and/or other information.

In an embodiment, the type of binding can be based on the permission retrieved from the license. For example, if the permission specifies that the content may be accessed for a limited amount of time, then the host computing device may generate a binding configuration that specifies the content to be associated with (or bound to) information stored on a host computing device. If the permission specifies that the content may be accessed for an unlimited amount of time, the host computing device may generate a binding configuration that specifies the content to be associated with (or bound to) information stored on a SIM card, such as the IMSI. In another embodiment, the type of binding can be based on the type of content (i.e., content type). Content has a content type. Types of content can include, for example, music files, video files, audio files, image files, and other types. For example, if the content is an image file, the host computing device may generate a binding configuration that specifies the content to be associated with information stored on a host computing device. If the content is a video file, the host computing device may instead generate a binding configuration that specifies the content to be associated with a network identifier stored on a smart card.

After the binding configuration is generated, the host computing device associates the binding configuration with the content at 796. In an embodiment, the binding configuration can be associated by storing the binding configuration in the content. The binding configuration may, for example, be stored in a header or footer of the content. Alternatively, the configuration can be associated by storing a pointer to the binding configuration in the content. Thereafter, the host computing device transmits the license and the content (with or without binding configuration) to a memory device for storage.

Figure 8:
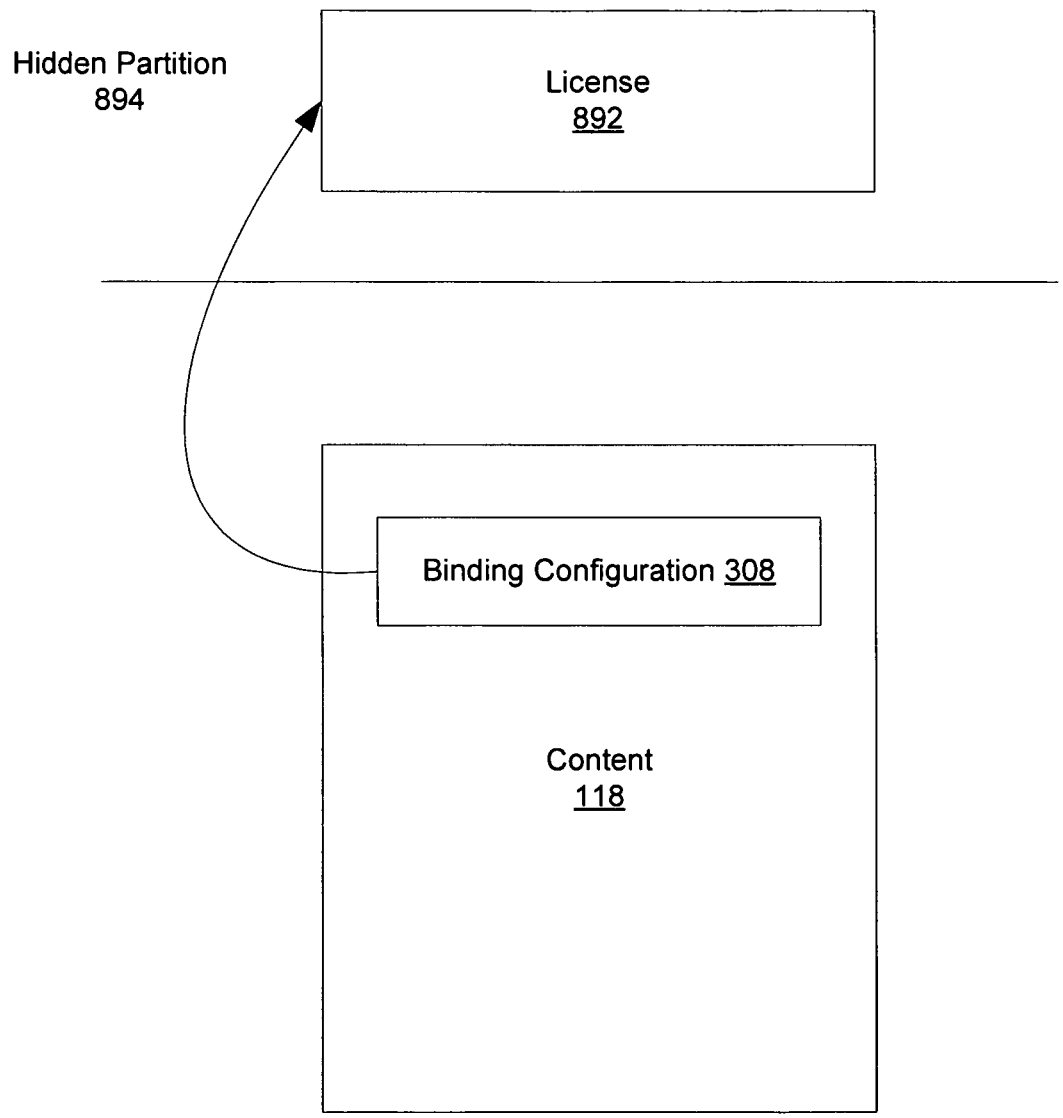
FIG. 8 is a simplified block diagram of a license and content with binding configuration, in accordance with an embodiment of the invention.

FIG. 8 is a simplified block diagram of a license and content with binding configuration, in accordance with an embodiment of the invention. FIG. 8 shows content 118 and license 892. Here, the binding configuration is stored in content 118. In an embodiment, binding configuration 308 can additionally include the location of license 892. For example, binding configuration can include a pointer to a location of license 892. License 892 may be stored in hidden partition 894 of a memory device where the license is not visible or accessible by many applications. The pointer in binding configuration 308 can point to the location of license 892 in hidden partition 894. As a result, multiple contents, such as content 118, can be configured to use one or more licenses, such as license 892. For example, multiple contents can include binding configurations, such as binding configuration 308, that point to one license. It should be appreciated that license 892 can also be configured to bind content 118 to a particular information stored on a memory device or computing device. For instance, license 892 can specify that content 118 is bound to information from a SIM card. With multiple licenses having different bindings, content 118 may be configured to bind to different information by including one or more pointers in binding configuration 308 that point to one or more licenses.

Figure 9:
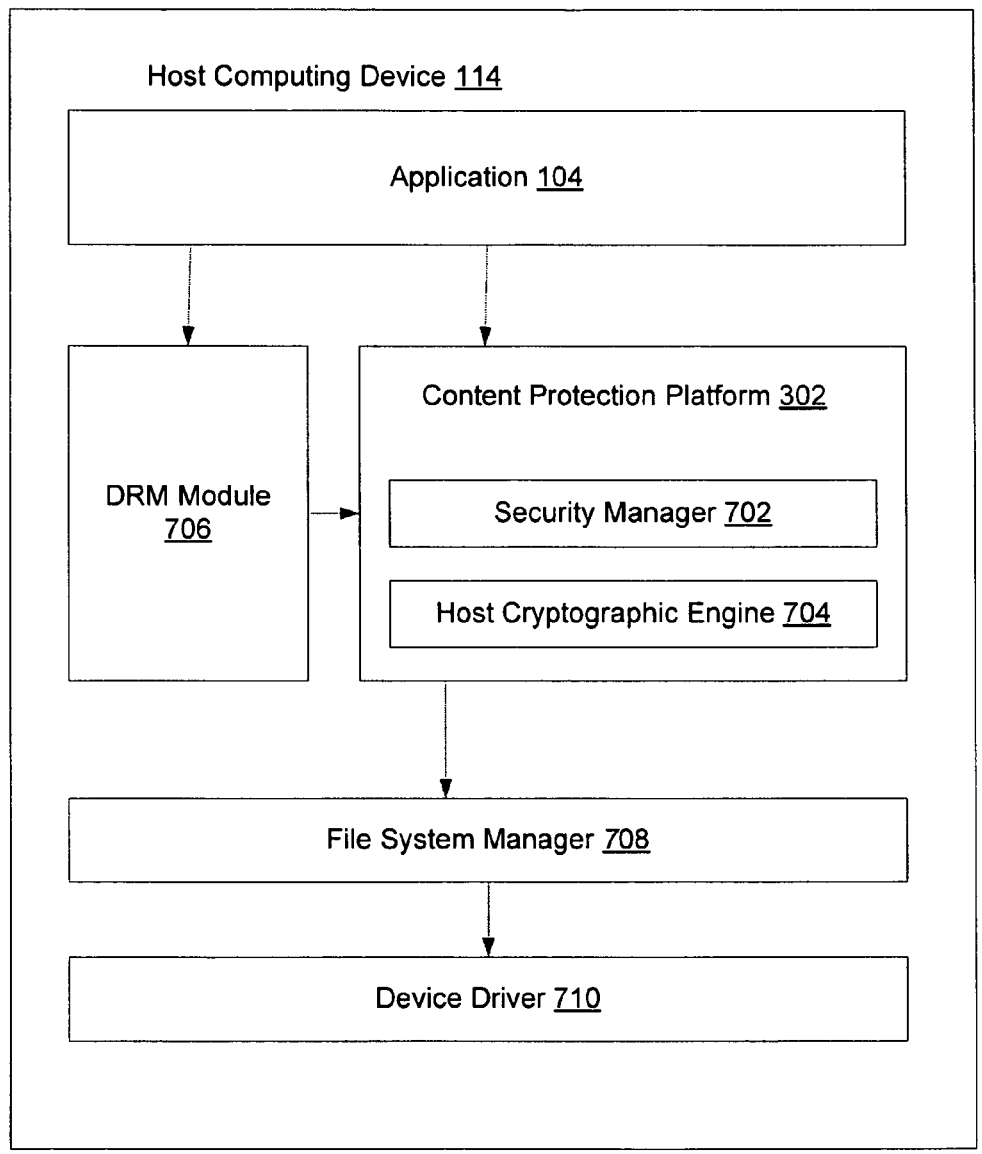
FIG. 9 is a simplified block diagram of program applications that may be hosted on a host computing device for accessing content and generating a binding configuration, in accordance with an embodiment of the invention.

FIG. 9 is a simplified block diagram of program applications that may be hosted on a host computing device for accessing content and generating a binding configuration, in accordance with an embodiment of the invention. Host computing device 114 may host application 104, digital rights management (DRM) module 706, content protection platform 302, file system manager 708, and device driver 710. As discussed above, application 104 may include a variety of program applications, such as multimedia players, video games, and other applications. In communication with application 104 are DRM module 706 and content protection platform 302. DRM module 706 allows host computing device 114 to manage the digital rights of content stored in a memory device or other locations. For example, DRM module 706 may protect content and control its distribution. As discussed above, content protection platform 302 is a technology platform for securing content on a memory device. Content protection platform 302 can include security manager 702 and host cryptographic engine 704. In general, security manager 702 manages the access of content stored in a memory device. Management operations include, for example, checking whether the content is protected, generating a parameter based on information retrieved from a memory device, accessing the content stored in a memory device based on the parameter, and other operations. Host cryptographic engine 704 includes the cryptographic libraries to handle cryptographic operations. Content protection platform 302 and DRM module 706 together provide host computing device 114 (and memory device that is removably coupled to the host computing device) with secure storage and content management capabilities. For example, content protection platform 302 and DRM module 706 allow secure storage of content (e.g., music files, movie files, software, and other data) stored in the memory device and enforcement of pre-defined policies for controlling access to the content.

In communication with content protection platform 302 is file system manager 708. In general, file system manager 708 is configured to manage and handle access (e.g., reading, writing, and other access operations) of content stored in a memory device. For example, file system manager 708 can read content from a memory device and transmit the content to content protection platform 302 for processing. Host computing device 114 can interface with a memory device. Host computing device 114 therefore can include device driver 710, which is in communication with file system manager 708, to interface with the memory device. Device driver 710 may, for example, include the lower-level interface functions to communicate with a memory device. An example of a lower-level interface function include input/out functions associated with input and output of data to and from the memory device.

Figure 10:
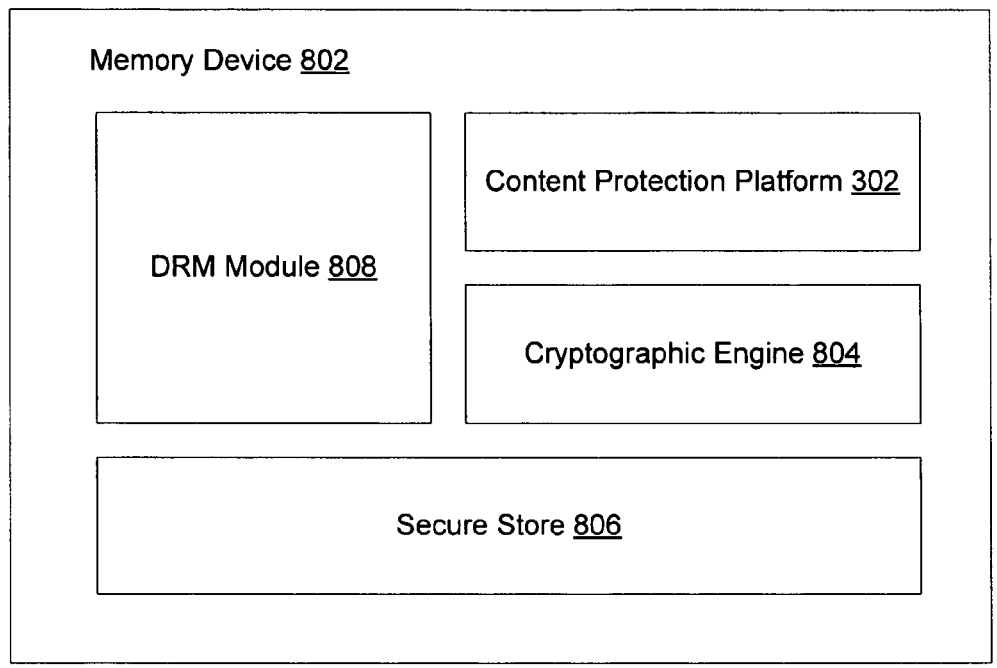
FIG. 10 is a simplified block diagram of program applications that may be included in a memory device, in accordance with an embodiment of the invention.

FIG. 10 is a simplified block diagram of program applications that may be included in a memory device, in accordance with an embodiment of the invention. Memory device 802 may include DRM module 808, content protection platform 302, cryptographic engine 804, and secure store 806. In memory device 802, DRM module 808 allows memory device 802 to manage the digital rights of content stored in the memory device. For example, DRM module 808 may be configured to enforce content rights. Content protection platform 302, as discussed above, is a technology platform for securing content stored in memory device 802. Content protection platform 302 may be configured to generate a parameter based on information retrieved from another memory device, accessing content stored in memory device 802 based on the parameter, and may be configured for other operations. Cryptographic engine 804 handles cryptographic operations and secure store 806 stores the cryptographic keys.

It should be appreciated that in other embodiments, host computing device 114 of FIG. 9 and memory device 802 of FIG. 10 may include fewer or more program applications apart from those shown in FIGS. 9 and 10. For example, as shown in FIG. 9, file system manager 708 and device driver 710 may be integrated into content protection platform 302. Host computing device 114 of FIG. 9 may therefore include DRM module 706 and content protection platform 302.

Figure 11:
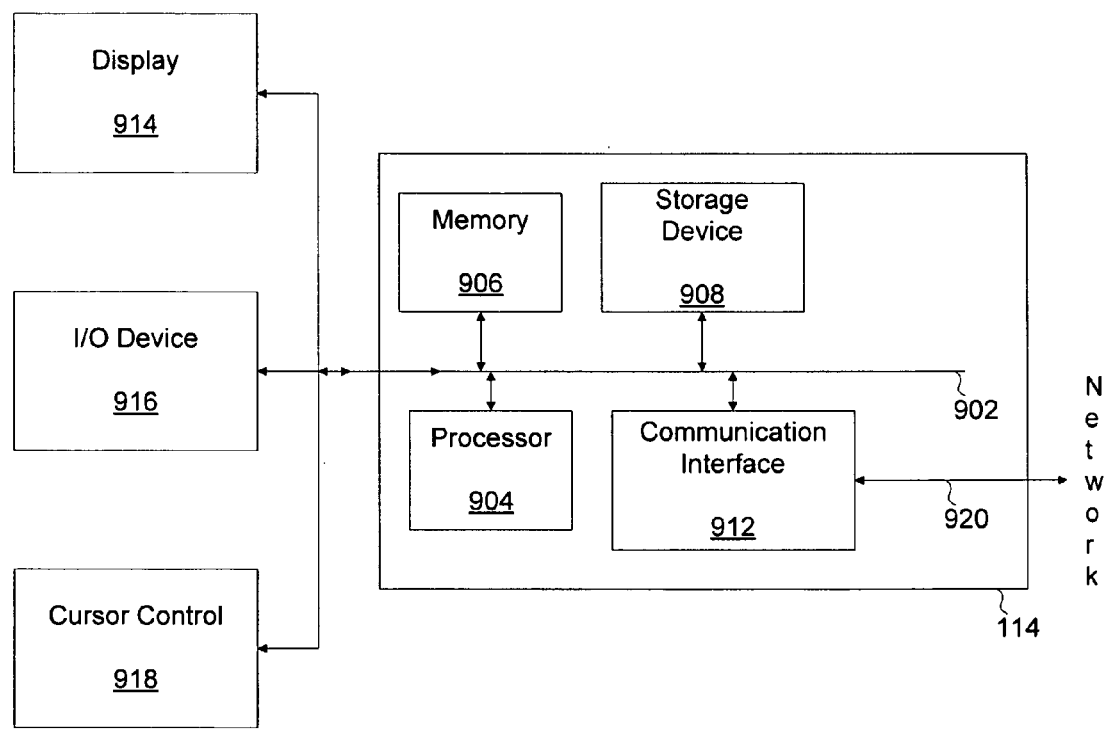
FIG. 11 is a simplified block diagram of a general overview of a host computing device suitable for hosting a content protection platform and other program applications, in accordance with an embodiment of the invention.

FIG. 11 is a simplified block diagram of a general overview of a host computing device suitable for hosting a content protection platform and other program applications, in accordance with an embodiment of the invention. In some embodiments, host computing device 114 may be used to implement computer programs (e.g., content protection platform), logic, applications, methods, processes, or other software to access content. Examples of host computing device 114 include a desktop computer, a server, a portable computing device, a personal digital assistant, a mobile phone, a computational engine within an appliance, and other computer systems. As shown in FIG. 11, host computing device 114 includes bus 902 or other communication mechanism for communicating information, which interconnects subsystems and devices, such as processor 904, system memory 906 (e.g., random access memory (RAM)), storage device 908 (e.g., read only memory (ROM), magnetic disk drives, optical disk drives, and other storage devices), communication interface 912 (e.g., modem or Ethernet card), display 914 (e.g., cathode ray tube (CRT) or liquid crystal display (LCD)), input/output device 916 (e.g., keyboard), and cursor control 918 (e.g., mouse or trackball).

In some embodiments, host computing device 114 performs specific operations by processor 904 when executing one or more sequences of one or more program instructions stored in system memory 906. Such program instructions may be read into system memory 906 from another computer readable medium, such as storage device 908. In some embodiments, hard-wired circuitry may be used in place of or in combination with software program instructions to implement embodiments of the invention.

It should be appreciated that the term "computer readable medium" refers to suitable medium that participates in providing program instructions to processor 904 for execution. Such a medium may take many forms, including but not limited to, non-volatile media, volatile media, and transmission media. Non-volatile media may include, for example, optical or magnetic disks, such as storage device 908. Volatile media may include dynamic memory, such as system memory 906. Transmission media includes coaxial cables, copper wire, and fiber optics, including wires that comprise bus 902. Transmission media can also take the form of acoustic or light waves, such as those generated during radio wave and infrared data communications. Common forms of computer readable media include, for example, magnetic mediums (e.g., floppy disk, flexible disk, hard disk, magnetic tape, and other magnetic mediums), optical mediums (e.g., compact disc read-only memory (CD-ROM) and other optical mediums), physical medium with patterns (e.g., punch cards, paper tape, any other physical mediums), memory chips or cartridges, carrier waves, (e.g., RAM, programmable read-only memory (PROM), erasable programmable read-only memory (EPROM), flash memory, and other memory chips or cartridges), and any other medium from which a computer can read.

In some embodiments, execution of the sequences of program instructions to practice the embodiments may be performed by a single computing device 114. In other embodiments, two or more computer systems, such as host computing device 114, coupled by communication link 920 (e.g., local area network (LAN), public switched telephone network (PSTN), wireless network, and other communication links) may perform the sequence of program instructions to practice the embodiments in coordination with one another. In addition, computing device 114 may transmit and receive messages, data, and instructions, including program, i.e., application code, through communication link 920 and communication interface 912. Received program instructions may be executed by processor 904 as the program instructions are received, and/or stored in storage device 908, or other non-volatile storage for later execution.

Figure 12:
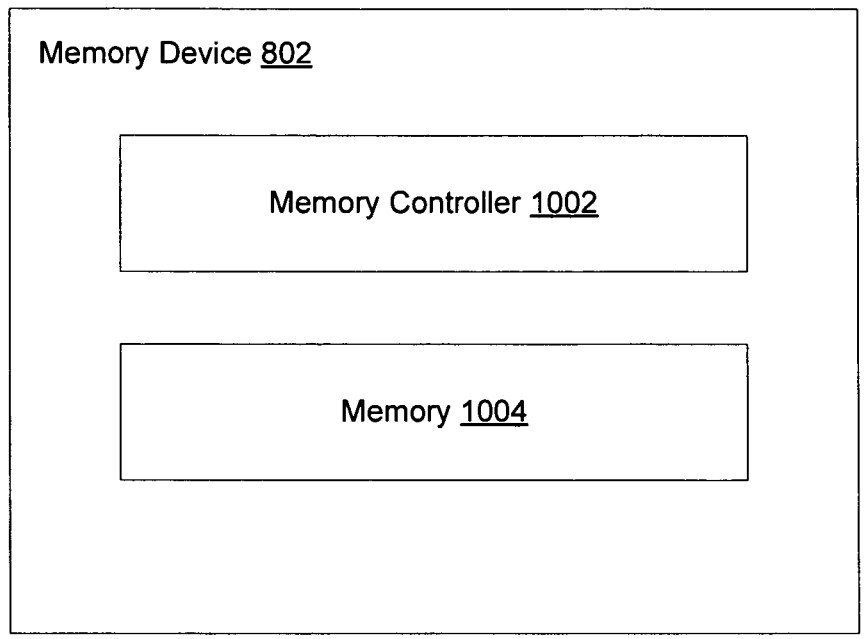
FIG. 12 is a simplified block diagram of a memory device, in accordance with an embodiment of the invention.

FIG. 12 is a simplified block diagram of a memory device, in accordance with an embodiment of the invention. As shown in FIG. 12, memory device 802 includes memory controller 1002 in communication with memory 1004. In general, memory controller 1002 controls the operation of memory 1004. Examples of operations include writing (or programming) data, reading data, erasing data, verifying data, and other operations. Additionally, memory controller 1002 may be configured to generate a parameter based on information retrieved from another memory device, access content stored in memory 1004 based on the parameter, and may be configured for other operations described above.

Memory device 802 can include a variety of non-volatile memory structures and technologies. Examples of memory technologies include flash memories (e.g., NAND, NOR, Single-Level Cell (SLC/BIN), Multi-Level Cell (MLC), Divided bit-line NOR (DINOR), AND, high capacitive coupling ratio (HiCR), asymmetrical contactless transistor (ACT), and other flash memories), erasable programmable read-only memory (EPROM), electrically-erasable programmable read-only memory (EEPROM), read-only memory (ROM), one-time programmable memory (OTP), and other memory technologies. In an embodiment, memory device 802 may be a smart card using EEPROM, ROM, or other memory technologies. Examples of smart cards include a contactless smart card, a Subscriber Identity Module (SIM) card, and other smart cards. In another embodiment, memory device 802 can be a flash memory card using flash memory. Examples of flash memory cards include a variety of the following trademarked products such as Secure Digital™ (compliant with specifications maintained by the SD Card Association of San Ramon, Calif.), MultiMediaCard™ (compliant with specifications maintained by the MultiMediaCard Association ("MMCA") of Palo Alto, Calif.), MiniSD™ (as manufactured by SanDisk, Inc.), MicroSD™ (as manufactured by SanDisk, Inc.), CompactFlash™ (compliant with specifications maintained by the CompactFlash Association ("CFA") of Palo Alto, Calif.), SmartMedia™ (compliant with specifications maintained by the Solid State Floppy Disk Card ("SSFDC") Forum of Yokohama, Japan), xD-Picture Card™ (compliant with specifications maintained by the xD-Picture Card Licensing Office of Tokyo, Japan), Memory Stick™ (compliant with specifications maintained by the Solid State Floppy Disk Card ("SSFDC") Forum of Yokohama, Japan), TransFlash™ (as manufactured by SanDisk, Inc.), and other flash memory cards. In an embodiment, memory device 802 can be implemented as a non-removable memory device.

The following patent documents contain embodiments that can be used with the embodiments described herein. Each of these patent documents is being filed on the same date as the present application, is assigned to the assignee of the present invention, and is hereby incorporated by reference: "Methods for Linking Content with License," U.S. patent application Ser. No. 11/599,655; "Apparatuses for Linking Content with License," U.S. patent application Ser. No. 11/600,270; "Methods for Accessing Content Based on a Session Ticket," U.S. patent application Ser. No. 11/600,263; "Apparatuses for Accessing Content Based on a Session Ticket," U.S. patent application Ser. No. 11/600,273; "Methods for Binding Content to a Separate Memory Device," U.S. patent application Ser. No. 11/600,262; "Method for Allowing Multiple Users to Access Preview Content," U.S. patent application Ser. No. 11/599,994; "System for Allowing Multiple Users to Access Preview Content," U.S. patent application Ser. No. 11/599,995; "Method for Allowing Content Protected by a First DRM System to Be Accessed by a Second DRM System," U.S. patent application Ser. No. 11/600,005; "System for Allowing Content Protected by a First DRM System to Be Accessed by a Second DRM System," U.S. patent application Ser. No. 11/599,991; "Method for Connecting to a Network Location Associated with Content," U.S. patent application Ser. No. 11/600,300; and "System for Connecting to a Network Location Associated with Content," U.S. patent application Ser. No. 11/600,006.

Although the foregoing embodiments have been described in some detail for purposes of clarity of understanding, the embodiments are not limited to the details provided. There are many alternative ways of implementing the embodiments. Accordingly, the disclosed embodiments are to be considered as illustrative and not restrictive, and the embodiments are not to be limited to the details given herein, but may be modified within the scope and equivalents of the appended claims. In the claims, elements and/or operations do not imply any particular order of operation, unless explicitly stated in the claims.

What is claimed is:

1. A computing device removably coupled with a first memory device (SIM Card) storing information and a second memory device storing content, an account protecting the content from unauthorized access, and a binding configuration specifying how a parameter needed to authenticate to the account is to be generated from the information, the computing device comprising:

a memory; and a processor in communication with the memory, the processor being configured to:

retrieve the information from the first memory device;

retrieve the binding configuration from the second memory device;

generate the parameter to authenticate to the account from the information based on the binding configuration; and authenticate to the account on the second memory device based on the parameter and gain access to the content after authenticating to the account;

wherein the first memory device is a smart card.

2. The computing device of claim 1, wherein the computing device is a mobile phone.

3. The computing device of claim 1, wherein the information is an identifier associated with a mobile phone.

4. The computing device of claim 1, wherein the parameter is a nonce, the nonce being configured for use in generating an authentication key.

5. The computing device of claim 1, wherein the parameter is an authentication key.

6. The computing device of claim 1, wherein the information is a network identifier.

7. A method for accessing content, the method comprising:
performing the following in a host device removably coupled with a first memory device storing information and a second memory device storing content, an account protecting the content from unauthorized access, and a binding configuration specifying how a parameter needed to authenticate to the account is to be generated from the information:
retrieving the information from the first memory device;
retrieving the binding configuration from the second memory device;
generating the parameter to authenticate to access the account from the information based on the binding configuration; and
authenticating to the account on the second memory device based on the parameter and gaining access to the content stored in the second memory device after authenticating to the account;
wherein the first memory device is a smart card.

8. The method of claim 7, wherein the computing device is a mobile phone.

9. The method of claim 7, wherein the information is an identifier associated with a mobile phone.

10. The method of claim 7, wherein the parameter is a nonce, the nonce being configured for use in generating an authentication key.

11. The method of claim 7, wherein the parameter is an authentication key.

12. The method of claim 7, wherein the information is a network identifier.

13. The method of claim 7, wherein the content is configured to be decrypted by a key stored in the second memory device.

14. The method of claim 13 further comprising receiving decrypted content from the second memory device after accessing the account.

15. The method of claim 13, wherein the content is configured such that the parameter alone is insufficient to decrypt the content.

16. The method of claim 13, wherein the second memory device is further configured to, in response to the account being accessed, use the key stored in the second memory device to decrypt the content.

* * * * *

UNITED STATES PATENT AND TRADEMARK OFFICE
CERTIFICATE OF CORRECTION

PATENT NO.       : 8,763,110 B2
APPLICATION NO.  : 11/600245
DATED            : June 24, 2014
INVENTOR(S)      : Jogand-Coulomb et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1514 days.

Signed and Sealed this
Eleventh Day of August, 2015

Michelle K. Lee
*Director of the United States Patent and Trademark Office*